Sept. 21, 1926.
F. B. COCKBURN
MACHINE TOOL CARRIAGE
Filed Feb. 26, 1923
1,600,401
6 Sheets-Sheet 1
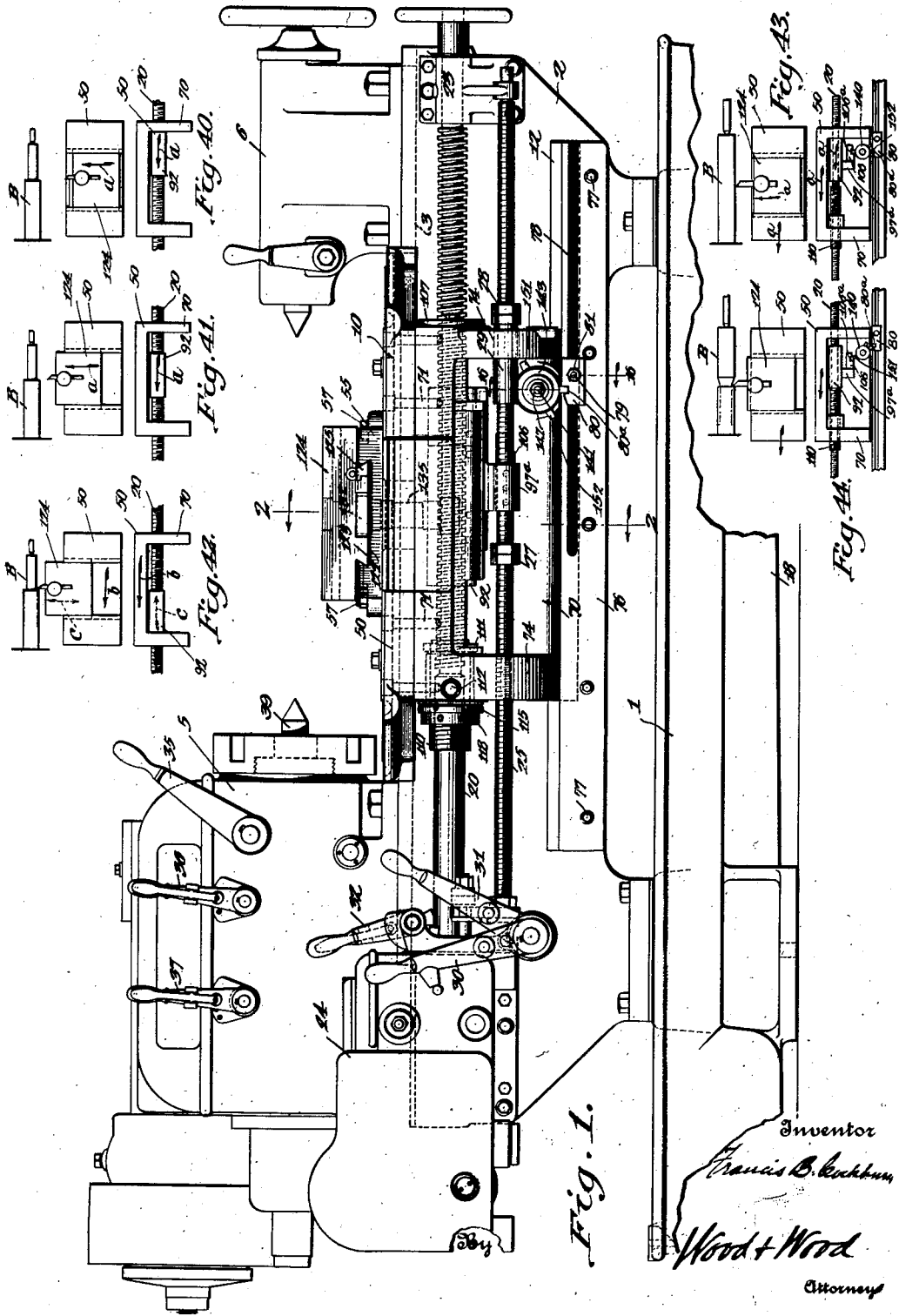

Sept. 21, 1926.
F. B. COCKBURN
1,600,401
MACHINE TOOL CARRIAGE
Filed Feb. 26, 1923
6 Sheets-Sheet 2
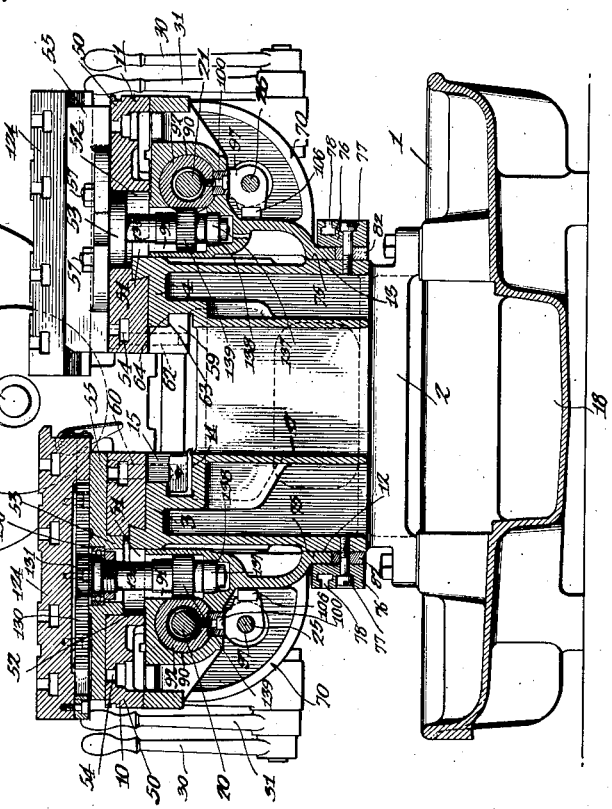
Inventor:
Francis B. Cockburn
By Wood & Wood
Attorneys Sept. 21, 1926.
F. B. COCKBURN
1,600,401
MACHINE TOOL CARRIAGE
Filed Feb. 26, 1923        6 Sheets-Sheet 3
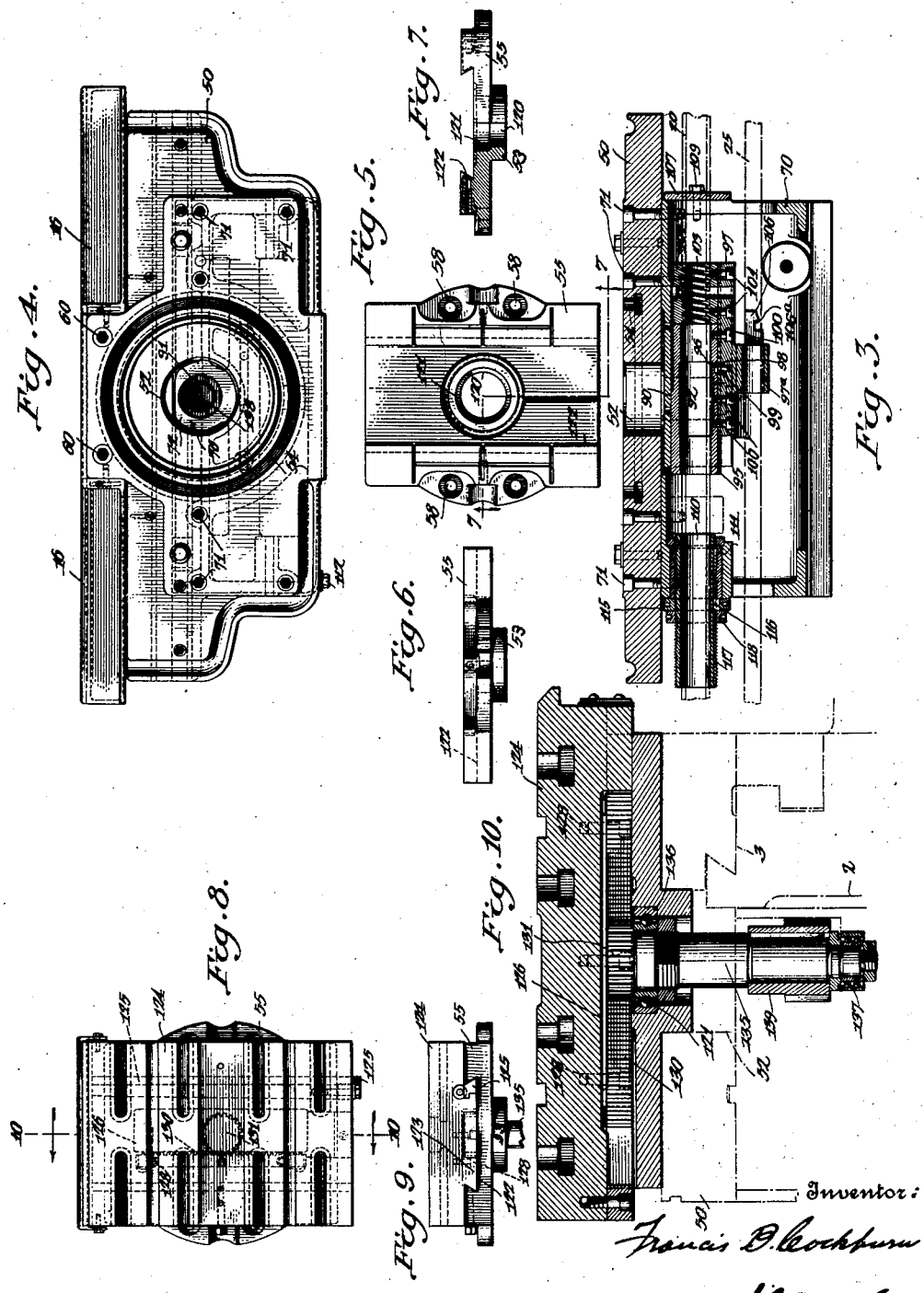
Inventor:
Francis B. Cockburn
By Wood & Wood
Attorneys Sept. 21, 1926.
F. B. COCKBURN
MACHINE TOOL CARRIAGE
Filed Feb. 26, 1923
1,600,401
6 Sheets-Sheet 4
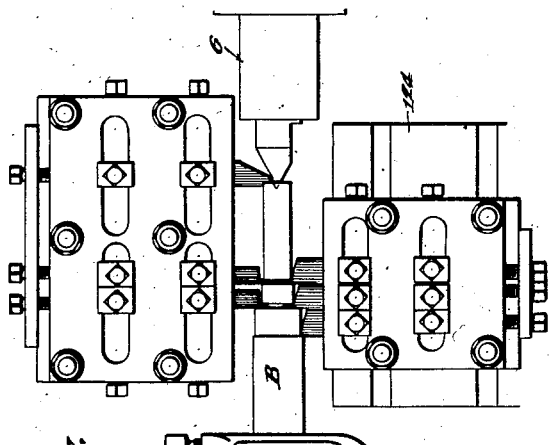
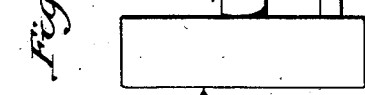
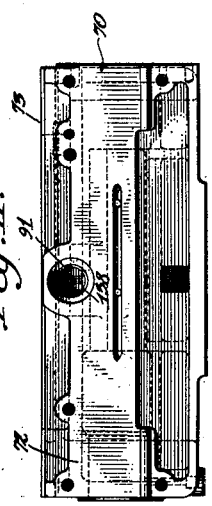
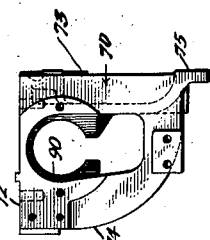
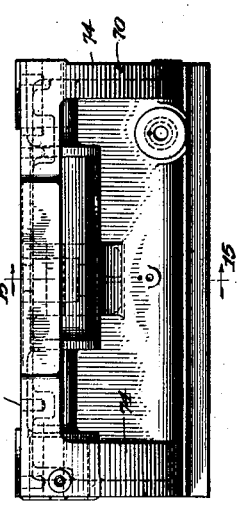
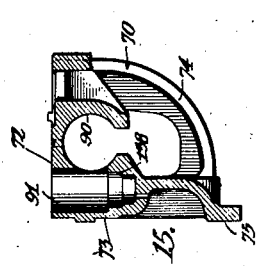

Sept. 21, 1926.  1,600,401
F. B. COCKBURN
MACHINE TOOL CARRIAGE
Filed Feb. 26, 1923  6 Sheets-Sheet 5
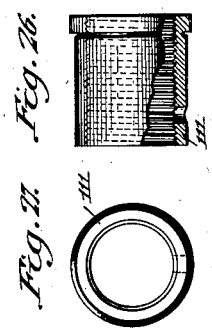
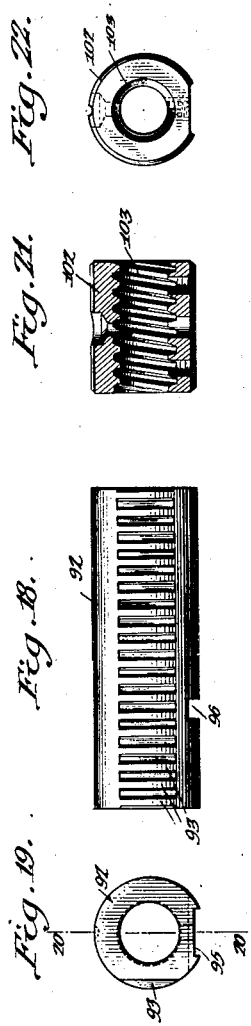
Inventor:
Francis B. Cockburn
By Wood & Wood
Attorneys

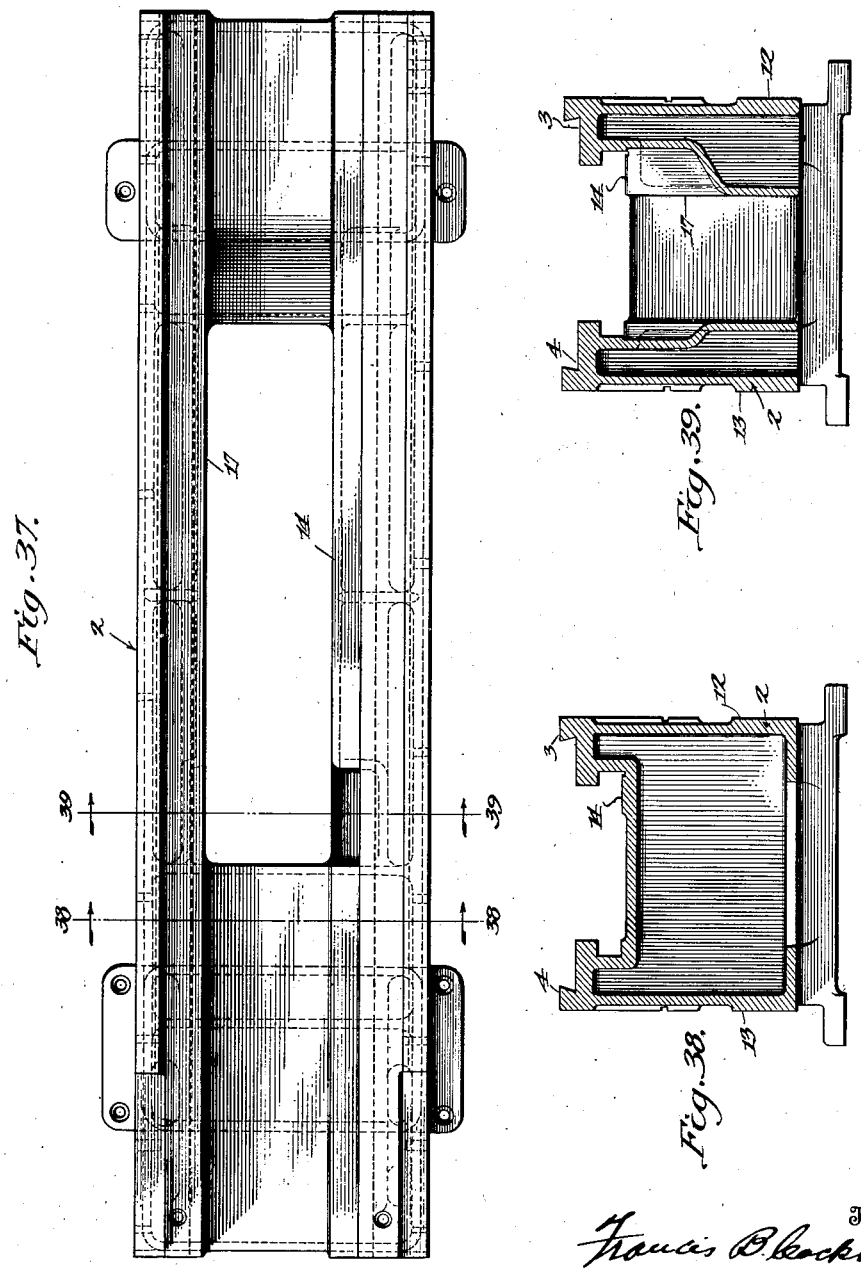

Patented Sept. 21, 1926.

1,600,401

UNITED STATES PATENT OFFICE.

FRANCIS B. COCKBURN, OF CINCINNATI, OHIO, ASSIGNOR TO THE LODGE & SHIPLEY MACHINE TOOL COMPANY, OF CINCINNATI, OHIO, A CORPORATION OF OHIO.

MACHINE-TOOL CARRIAGE.

Application filed February 26, 1923. Serial No. 621,215.

This invention relates generally to a metal cutting and turning machine of the engine lathe type, wherein the work to be machined is engaged between the machine head and tail stock centers and rotatively connected with the head stock revolving spindle or directly attached to the spindle, and refers more particularly to a translatable cutting tool carrying support for moving the cutting tool or tools in work cutting and retreating directions transversely to and longitudinally of the rotative axis of the work or at an angle thereto, the tool carrying support consisting of a tool holding slide translatable upon a carriage and the carriage translatable upon the bed of the machine longitudinal of the work carrying centers.

A feature of the invention is to provide a translating or propelled member, as a nut non-rotatively engaged upon the feed screw of a lathe to feed the tool slide, mounted upon a carriage to and from the work for depth cutting or facing and to translate or feed the carriage upon the rails of the lathe bed for feeding the tool longitudinally of the work for turning. The direction of rotation of the feed screw governs the direction of tool slide and carriage translation. The translating member is provided with a rack transmittingly, by means of gearing, connected with the tool slide, the gearing including a rack fixed to the tool slide, thus as the translating member is either moved in forward or reverse direction by the feed screw the tool slide is coordinately moved. The arrangement also provides for a universal or angular adjustment of the tool slide without disturbing the feeding or translating connection. The translating member or feed nut is capable of moving within non-carriage conveying lengths or limits for independently feeding the tool slide, after which it engages the carriage for carriage feed, which renders the translating member ineffective for independent tool slide feed. Therefore through the rotative control of the feed screw the tool slide and its cutting tool can be operated in several complete working cycles as bringing the tool to and into the work for depth cutting or facing and retreating the tool, or bringing the tool to and into the work thence longitudinally of the work for turning and retreating in corresponding reverse directions. The degree of tool slide motion independent of the carriage depending upon the degree that the translating member is permitted to move without conveying the carriage this in the machine being adjustable or regulatable to meet the condition required.

It is therefore an object of the invention to provide a single screw fed carriage and tool slide propelling member for translating the carriage and tool slide as a unit, and the tool slide independently upon the carriage for feeding the cutting tool or tools mounted upon the tool slide in directions transverse or angular to the rotative axis of the work and parallel or longitudinal therewith, and governed through the control of said propelling member, for manual or automatic functioning, and in providing a machine simple in construction and powerful, for rapid and accurate machining of the work and in which the machine can be quickly and conveniently set for automatically completely machining a variety of work without the application of special attachments or devices to the machine for each piece of work and in which a change in machine setting for the different pieces of work is made by screw or nut adjustment.

Further objects and features of the invention will be more fully set forth in the description of the accompanying drawings forming a part of this specification, in which:

Figure 1 is a side elevation showing my invention applied as an element of an automatic lathe.

Figure 2 is a cross section on line 2—2, of Figure 1, the carriages being shown in opposition, as when operating upon the work, from relatively opposite sides.

Figure 3 is a longitudinal section through the front carriage and apron attached thereto, the swivel block and top slide being omitted.

Figure 4 is a top plan view of the carriage with track covers attached.

Figure 5 is a detail top plan view of the swivel.

Figure 6 is a side view of the same.

Figure 7 is a sectional end elevation on line 7—7, of Fig. 5.

Figure 8 is a top plan view of the front cross slide with swivel block attached.

Figure 9 is an end view of the structure of Fig. 8.

Figure 10 is an enlarged detail section on line 10—10, of Fig. 8, showing the power transmitting shaft and gears for connecting the cross slide with the apron rack, portions of the carriage, apron and lathe bed being shown in dot-and-dash lines.

Figure 11 is a detail plan of the front apron.

Figure 12 is a side elevation of the same.

Figures 13 and 14 are respectively elevations from opposite ends of the apron.

Figure 15 is a cross section on line 15—15, of Fig. 12.

Figure 16 is an enlarged detail section on line 16—16, of Fig. 1, showing the cross slide trip mechanism.

Figure 17 is a plan view illustrating tool relations to one class of work.

Figure 18 is an elevation of the rack.

Figure 19 is an end view of the same.

Figure 20 is a longitudinal section on line 20—20, of Fig. 19.

Figure 21 is a sectional view of the lead screw nut.

Figure 22 is an end view of the same.

Figures 23, 24 and 25, are respectively a side elevation, end view, and top plan of the trip block.

Figure 26 is a sectional elevation of the stop screw nut.

Figure 27 is an end elevation of the same.

Figures 28 and 29 are respectively a section elevation and end elevation of the stop screw.

Figures 30, 31, are respectively a face view and sectional edge view of the graduated stop screw operating nut.

Figures 32, 33, are respectively a face view and a sectional edge view of the stop screw operating jam nut.

Figures 34, 35 and 36, are respectively a plan, a rear edge view, and an end view of the track cover.

Figure 37 is a detail plan view of the bed.

Figure 38 is a cross section on line 38—38, of Fig. 37.

Figure 39 is a section on line 39—39, of Fig. 37.

Figures 40, 41, and 42, are diagrammatic views illustrating tool slide feed, relative to carriage motion.

Figures 43 and 44 are diagrammatic views showing the manner in which the tool can be caused to feed and cut simultaneously.

Referring to the drawings, 1 indicates the base of the machine which is represented as of pan form and arranged to provide base supports for pillars extending from opposite ends of the bed 2. The bed comprises a pair of co-planar parallel rails 3, 4, the body portion of each being of double wall construction for rail stability to independently support a tool carriage. The walls of rails at their opposite ends are integrally connected by cross walls within areas respectively covered by a head stock 5 bridging between and supported upon one end of the rail and a tail stock 6 at the opposite end and between which the work is rotatively supported in the usual manner.

The tail stock may be of a design and structure corresponding to a tail stock of a commercial engine lathe having an axially adjustable dead center for engaging one end of the work.

The central portion between the rails is open to permit the tool cuttings to be conducted downwardly into the pan base and the upper portion of each rail machined to provide a gibbed engagement for its respective tool carriages 10 and 11 translatable upon the rails longitudinally thereof. The rails independently support and guide a tool carriage for operating upon the work from relative opposing sides, the carriage structure of one being substantially the duplicate of the other. The carriages are operable independently or simultaneously and controlled from either side of the machine, so that the description as to details of construction will be confined to the singular and for designating purposes.

The carriage 10 on rail 3 carries its cutting tools to operate against the work in the downward half revolution thereof and will be referred to as the front carriage and the carriage 11 upon rail 4 as the rear carriage. Therefore, the front carriage has a rail engagement for supporting it against downward bearing strains and the rear carriage against upward bearing strains.

The rails or opposite sides of the bed at the base and longitudinally thereof are machined to provide bearing surfaces 12 and 13 respectively for the lower ends of the carriage aprons.

The front rail 3, along its inner side, is provided with a horizontal wide-faced bearing surface 14 engaged by cover plates or shoes 16, 16, secured to opposite sides of the gib-block 15, secured to the under side of the carriage. The bearing surface 14 is engaged by the gib-block 15, rigidly supporting the rear end of the carriage 10 to sustain the same against any yield to downward thrust strains. As the thrust strains for the carriage 11 are in an upward direction, such additional carriage support is not required, and, therefore, eliminated. The shoes 16, 16, (see Fig. 4), are of appropriate length to guard against any deposit of cuttings upon the rail surfaces 14 and which to a degree is also protected by the over-rail extending rear end portion of the carriage. The cuttings from the tools of both carriages descend through the opening or conduit 17 formed by open end spacing of the opposite inside walls of the rail into the pan 1 which is arranged to drain the lubricant into a central chamber 18.

As the present invention is particularly directed to the construction of the carriage, its rail support and method of carriage translation or traverse upon the rail and tool slide feed upon the carriage, the control of which may be either manual or automatic, more specific reference will be made to the automatic control as the machine is more particularly adaptable as a high production manufacturer's tool for rapidly machining duplicate pieces of work.

Each carriage has its own transmission shaft or feed screw, therefore two feed screws 20, 21, disposed longitudinally at opposite sides of the machine bed, are employed, each screw shaft at the tail stock end being journaled in a bearing 23 fixed to the lathe bed and its opposite end extending into and journaling within bearings in a transmission casing 24, secured to the head stock end of the machine. The screw shaft transmission and controlling mechanism, therefor, housed within said casing 24, is not disclosed in detail herein, the same forming an invention distinct and separate hereof. Likewise two transmission controlling shafts, as screw shafts 25, 26, are employed, one for each carriage, extending parallel with the screw shafts and beneath the same longitudinally of the bed, each longitudinally slidably journaled in the bearings at its opposite ends, one end journaled in a bearing as a part of the bearing 23 and the opposite end within a bearing of the transmission casing 24. The transmission controlling shafts or rods 25, 26, are each threaded their entire length between their opposite end bearings and carry a pair of nuts 27, 28, and a sleeve 29, having a threaded engagement with the shaft and interposed between the nuts 27, 28.

In Fig. 1, the sleeve 29 on the front shaft 25 is shown as engaged against the nut 28. The transmission controlling shaft extends freely through the protruding portion at the opposite ends of the carriage frame structure. The sleeve 29 may be regarded as an extension for the nut 28. The spacing distance between the nuts 27, 28, the latter including the sleeve 29, governs the period of, or time of carriage and tool slide traverse upon the rail in either forward or return directions, the nuts as trip dogs being engaged by a carriage member. The nut 27 is engaged when the carriage moves in a forward direction toward the head stock and the nut 28, with sleeve 29, as a unit, in the return traverse of the carriage toward the tail stock, whereby the rod 25 for the front carriage is shifted longitudinally for feed screw transmission automatic control as for starting, stopping and reversing. The manual control may be effected by the levers 30, 31, 32, disposed at one end of the transmission casing 24. Lever 30 is common to both feed screw transmissions, functioning to simultaneously start the transmission for both carriages, while levers 31, 32, for a respective individual transmission control, lever 31 for starting and lever 32 for stopping and reversing. The transmission for each feed screw receives its power either direct from the main driving source of the machine or through the spindle of the head stock. The transmission arrangement employed forms no part of the present invention and therefore is not disclosed, but may represent any commercial type of engine lathe head stock transmission. Levers 35, 36, 36, provide control for the transmission of the spindle 39 journaled within the head stock casing 5.

Carriage and tool slide construction.

As the carriage 10 on one side of the bed and the carriage 11 at an opposite side together provide for a dual turning of the work with one or a multiplicity of tools for each side, the working capacity of the machine is greatly increased, and as the tool slide for each carriage is arranged for carrying a plurality of cutting tools, stability of carriage mounting and a powerful transmission for carriage traverse and tool slide feed are very important, for an accurate and rapid turning or machining of the work. The carriages and their respective tool slides are of duplicate construction, each operative through its own feed screw, and each having its own transmission control, thus adapting the same for simultaneous or relative independent operation, by which arrangement longitudinal and depth cutting may be performed on the work at opposite sides at the same time.

Confining the detail description to a single carriage and its operative mechanism, it consists of a plate 50, having its under side longitudinally machined for a gibbed engagement with the top of the rail 3. The carriage plate 50 centrally is provided with a circular opening 52 vertically therethrough for the reception of a corresponding circular boss 53 of the swivel block 55, which swivel block rests upon the upper face of the carriage plate and is capable of rotative movement and adjustment thereupon about the boss 53 as a pivot. A circular T-slot 54, concentric with the opening 52 is provided in the upper side of the carriage, into which slot are engaged the heads of bolts 57, having their shanks extended upwardly through the openings 58 of the swivel block, and having nuts engaged therewith, whereby the swivel block may be clamped in any desired angular position relative to the carriage. The carriage plate is clamped to the rail against vertical displacement by a gib block 15. The gib block 15 is held by the screws 60 passing through the carriage plate, and said gib block has its lower end engaged with the tracked surface 14. The downwardly directed strains or thrusts are thus sustained and the carriage stabilized. The rear carriage is attached to the track 4 by a clamp or gib block 59 held by the screw 62, the upper surface 63 engaging an undercut lower surface 64 of the track 4. The upwardly directed thrusts or strains on the rear carriage are thus sustained by the clamp, the carriage thereby steadied.

The apron 70 is fastened by bolts 71 to and beneath the carriage plate 50, and comprises a box-like casting having horizontal and vertical substantially plane faces respectively 72, 73, at a right angle to each other. The outer side of the apron at its opposite end is provided with bracket walls having a flanged front face 74 curved downwardly and inwardly. A bearing surface 75 is provided at the bottom of the vertical face 73 which is designed for sliding coaction with the surface 12 to assist in stabilizing the carriage. A guide strip 76 extending lengthwise of the bed and attached thereto by screws 77 overlaps the lower edge of the apron which is slidably held between the strip and the surface 12. The strip 76 is provided with a longitudinal T-groove 78 at its outer surface for the reception of a bolt 79, the shank of which traverses a trip plate 80 having a notch 80$^a$ in its upper edge, which plate may be adjusted lengthwise of the slot and clamped in adjusted position by the nut 81. The strip 76 is bolted against spacer blocks 82. The slideway formed between the strip 76 and surface, together with the gib 51 and clamp 8 provide for very substantial sliding connection between the bed, carriage and apron.

The apron has formed therein horizontal and vertical intersecting bores respectively 90, 91, at a right angle to each other, and horizontally slidably engaged within the bore 90 is a substantially cylindrical sleeve 92 having teeth 93 at one side, which teeth project within the bore 91 at a distance approximately equal to tooth depth. The rack is grooved longitudinally at the bottom as at 95, and cross-wise as at 96 to provide respectively a seat into which is fitted the upper end of a trip block 97 and a key groove registerable with the corresponding groove 98 of the trip block. The key 99 is engaged with both grooves 96 and 98 as a means of locking the block and sleeve together. The trip block is further attached to the sleeve by the screws 100.

At one end of the sleeve and abutting the same is attached to the trip block by screws 101, a feed screw nut 102 having internal threads 103 adapted to be engaged by the corresponding threads of the feed screw which passes loosely through the bore of the sleeve rack. The trip block has a depending projection 97$^a$ bored as at 97$^b$, said bore being loosely traversed by the trip shaft 25. The projection 97$^a$ has a rearward extension grooved as at 104. Attached within the groove by suitable screws is a catch plate 106, having the notch 106$^a$ in its lower edge, the function of which will be hereinafter described. The rack sleeve 92 and nut 102 may be regarded as a unit non-rotatively secured within the apron so as to be fed or traversed longitudinally upon the feed screw or screw shaft 20 in forward or return direction, forward toward the head stock and return toward the tail stock depending upon the direction of revolution of the screw shaft 20. The nut traverses the carriage when engaged therewith and provision is made for the nut to traverse freely within the carriage apron within regulatable limits for imparting motion to the tool slide mounted upon the carriage, thus the nut is utilized for both carriage traverse upon the rail and tool slide feed upon the carriage. The screw shaft 20 and transmission control rod 25 extend through openings in the opposite end bracket walls of the carriage apron, one wall thereof being provided with a stop plate 107 about the screw shaft 20 and secured to the wall by screws 109. The nut 102 in one direction of traverse upon the screw engages against the stop plate 107 for translatably connecting the nut and carriage. From this plate 107 the nut and its rack sleeve are free to travel toward the opposite apron wall without imparting any translating movement to the carriage during which the nut and its rack sleeve impart motion to the tool slide. The distance of translative movement of the nut upon the screw shaft 20 from the stop plate toward the head stock is limited by a sleeve stop screw 110, loosely traversed by the feed screw. (See Fig. 3.) The threads of the stop screw are engaged with the corresponding threads of the screw nut 111 held against rotation in a hub or boss cast in the end wall of the apron, by a set screw 112. The boss at outer side of the apron end wall extends slightly beyond the surface of the wall to provide an annular surface having thereon a graduation mark 113, (see Fig. 13), with which are registerable the graduations 114 of a stop screw adjusting nut 115, (see Figs. 3 and 31), splined as at 116 to the groove 117 of the stop screw, whereby when the nut 115 is rotated in either direction the stop screw will be rotated and translated in corresponding direction for a predetermined distance. A jam nut 118 holds the graduated stop screw nut in its adjusted position. When the feed nut 103 and its rack sleeve engages the inside end of the sleeve screw 110 fixed to the apron of the carriage it will translate the carriage upon its bed rail toward the head stock until traverse of the feed nut is stopped either by discontinuance of screw shaft rotation or reversing its rotation. The distance between the plate 107 and the inside end of sleeve screw 110 therefore defines the degree of feed nut traverse for transmitting motion to the tool slide and the distance regulatable by adjusting the sleeve screw for developing a determined amount of tool slide feed as well as timing the carriage traverse relatively with the feed of the tool slide. It is obvious that the plate 107 and sleeve screw 110 as opposite abutments carried by the carriage and engaged by the feed nut could be transposed as to their relative positions upon the carriage or the sleeve screw construction duplicated for opposing nut and carriage connections, or their construction modified or other means employed easily accessible for adjustment for abuttingly connecting the nut and carriage. which will permit a definite amount of noncarriage traverse feed nut travel.

The swivel block 55 (see Figs. 5, 6, 7) is bored concentrically with the boss 53 as at 120 and counterbored to provide a circumferential shoulder 121. The top of the swivel block has a dove-tail cross groove 122 as a slideway with which coacts the corresponding slide projection 123 of the tool holding slide 124, (see Figs. 8, 9) a gib 125 being interposed for slidably fitting the tool slide upon the swivel block. The cross or tool holding slide has the usual tool attaching T-grooves or slots in its upper face and has in addition a longitudinal depression or cavity 126 in its lower side within which is fitted and fastened as by screws 128 a gear rack 130. The slide rack 130 is transmittingly connected with the feed nut rack 92 in the following manner: A spur gear 131 meshing with the rack 130 is keyed or otherwise rigidly connected at the upper end of the journal or shaft 135 rotatively stepped in respective upper and lower ball bearings 136, 137, the upper ball bearing 136 seating in the counterbore 121 in the swivel block, and the lower ball bearing 137 against the seat shoulder 138 in the apron. Keyed upon the lower end of the shaft 135 is a sleeve spur gear 139 which meshes with the teeth 93 of the feed nut rack. Thus when the feed nut rack is moved in either direction by the rotation of the feed screw, the cross slide will be correspondingly fed upon the carriage as toward or away from the work.

*Operation of carriage and tool slide.*

Referring to Figs. 40 to 42 inclusive, which diagrammatically illustrate a cycle of carriage and tool slide operation, in Fig. 40 the nut rack 92 is shown as in engagement with the right apron wall or carriage abutment toward the tail stock end of the machine and the tool slide with its tool in a full retracted position for free access in securing the work between the machine center or for chucking the work to the spindle face plate as a starting position for machining the work. With the feed screw 20 set in motion in the appropriate direction the rack nut 92 will move upon the feed screw 20 between the carriage abutments in a direction indicated by the arrow *a* toward the head stock with the carriage at rest. Such non-carriage transmitting traverse of the rack nut 92 upon the screw shaft will impart rotative motion to the shaft and gearing connecting the rack nut and tool slide rack, feeding the tool slide inward in the direction indicated by arrow *a* on the tool slide toward the work to a desired work cutting depth. In Fig. 41 the rack nut 92 is shown in a position intermediate of the opposing carriage abutments. In Fig. 42 the rack nut 92 is engaged against the opposite carriage abutments, or against the inner end of the stop screw (not shown)) and the tool is in its depth cut position. Upon further rotation of the lead screw in the same direction, the rack continues to be engaged with the carriage, the carriage will be translated in a direction indicated by the arrow *b* and the tool will begin its cut for machining the work longitudinally with its axis. Upon reversing the direction of rotation of the lead screw, the rack will move independently of the carriage in the opposite direction, as indicated by the dotted arrow *c* of Fig. 42. The slide and tool will then travel away from the work until the rack abuts the opposite end of the apron, as indicated in Fig. 40. Thus, reversing the direction of travel of the rack, correspondingly reverses the direction of travel of the tool slide. The amount of tool slide feed, forward and return, is determined by the distance of rack nut travel upon the screw shaft between the carriage abutting limits, which permits the rack nut to traverse while the carriage is at rest, as the rack nut will transmit no motion to the tool slide when the carriage and rack nut are moving in the same direction and at the same rate of travel, although the rack nut is capable of transmitting motion to the tool slide should both carriage and rack nut be permitted to travel at a varying rate of speed. The range of tool slide traverse generally is such as to permit the cutting tools to be retracted to a position which will allow ample room for a convenient insertion and removal of the work between the machine centers or directly chucked to the face plate on the spindle for the maximum work diameter capacity of the machine.

For depth cutting alone the screw shaft rotation is controlled for rack nut traverse between the opposing carriage abutments, and, therefore, must be stopped or its rotation reversed before the rack nut is capable of propelling the carriage, as no means are provided in the present construction for feed control of the tool slide except through the rotative control of the screw shaft 20, and as the machine is primarily adapted for automatic control the feed control of the tool slide through the rotative control of the screw shaft is sufficient. This materially simplifies the construction of the machine, reduces the number of parts susceptible to wear, offers more accuracy in machining the work and avoids setting complications for automatically machining different varieties of work without the employment of cams or templets.

The transmission control for the screw shaft 20 is manually operated by the levers 30, 31 and 32, and automatically operated by the screw rod 25 when actuated by the rack nut translating member on the screw shaft 20. The transmission gearing and control therefor not forming a part of the present invention is fully disclosed and described in a copending application filed August 31, 1923, Serial No. 660,317. The screw shaft can be manually rotated by means of a hand wheel fixed to one end of the screw shaft.

For depth cutting, only the stops 27 and 29 on the transmission control rod are set so that the rack nut, through its depending hanger 97ª, engages the same and shifts the rod before the rack nut propellingly connects with the carriage. The actuation of the control rod is effective to either stop or reverse screw shaft rotation. The screw shaft transmission and its control are preferably of a type manually started as by appropriately throwing the lever 30 or lever 31 for both tool carriages, with the tool slide and its tool in a retracted position. The rack nut for a working cycle is traversed in a direction toward the head stock and at appropriate rates of speed and power degree according to the demand required for feeding the tool slide inwardly toward the work and cutting it into the work, the period of tool slide traverse inward being definitely regulated by the setting of the stop nut 27. As soon as the tools have been fed or advanced into the work to obtain the desired depth cut, the control rod 25 is shifted by the moving rack nut controlling the screw shaft transmission for either stopping or reversing the screw shaft rotation, preferably, however, reversing the rotation of the screw shaft and under a higher rate of speed for obtaining a rapid return traverse of the tool slide. The rack nut moves upon the screw shaft toward the tail stock end of the machine, the retreat motion continues until the rack nut engages with the stop member 29 and actuates the control rod to stop the screw shaft rotation.

For turning the work longitudinally with its axis, the tool slide feed, forward and retreat, is governed by the degree of independent non-carriage propelling traverse of the rack nut upon the screw shaft and which is micrometrically regulated for the inward or tool cutting feed advance by the screw sleeve abutment 110 of the carriage. The micrometric adjustment permits the tools to be definitely positioned before the carriage is propelled for taking an appropriate depth cut or necessary for turning the work to a definite diameter. As soon as the rack nut propels the carriage, the tool is carried or fed with the carriage, which may be referred to as the longitudinal work turning traverse of the cutting tool or tools. The degree of carriage propulsion is determined or regulated by the setting of the stops 27, 29, for forward or retreat carriage traverse. A stop setting is made to permit an operative cycle, as heretofore described with reference to Figs. 40, 41 and 42, under which condition the rack nut does not engage the stops 27, 29, until the carriage has been traversed its required distance. The transmission control follows substantially as hereinbefore set forth for the automatic cycle control of the tool slide for the preferred manner of operation. This would constitute, with the parts in position, as diagrammatically shown in Fig. 40, the starting or slow feeding traverse for the rack nut and tool slide in the direction of the arrows $a, a$, respectively, for bringing the tools to their cutting positions and continuing after tool positioning with the carriage traverse, feeding the tool longitudinally of the axis of the work, after which the transmission is tripped or shifted for a quick reverse transmission, whereupon the tool slide is first moved to convey its tools to their retreat position, after which the carriage follows in its retreat motion. The tools being first brought to a work clearing position, enables the employment of a plurality of tools set for turning the work to different diameters in one direction, as for circumferentially machining, forming and facing a piece of work for making an integral cluster of different diameter gears, commonly employed in automobile transmission mechanism.

The longitudinally cutting, which requires carriage traverse, is accomplished by the tools on one side of the work and the depth cutting and facing by the tools on the opposite side.

As the frictional resistance of one part upon another, due to a variety of causes, as the working strains of the advancing tools into the work sliding engagement and weight of the parts, may cause an undesirable propelling motion of one part to another, or it may be desirable to institute such propelling motion for advancing the tools to produce taper turning, provision is made for frictionally binding the carriage to the machine bed, or for causing the rack nut to propel the carriage before it engages a respective carriage abutment, or for positively and simultaneously moving both tool slide and carriage, which consists of the following mechanism.

The carriage apron intermediate of the transmision control rod 25 and guide strip 76, carries a toothed wheel 140 rotatably mounted upon a stub shaft 141 attached to and projecting outwardly from the apron at the outer side thereof. (See Figs. 1 and 16.) The toothed wheel is frictionally, yieldably held against rotation upon a cylindrical boss 142, by two friction discs 142ª, 142ᵇ, of suitable material such as asbestos, placed at relatively opposite sides of the wheel, one disc between the wheel and the side of the apron and the other at the outer side of the wheel, the discs and wheel being frictionally held together against the side of the apron by a sleeve 143 having a terminal circular flange 144, said flange in engagement with the outer friction disc 142ᵇ. The outer end of the sleeve is socketed as at 145, and a spring 146 is housed within the socket and is compressively adjustable therewithin by the nut 147. The teeth of the wheel are suitably spaced apart and, as shown in Fig. 43, two diametrically related teeth 151, 152, are adapted for engagement respectively with the notch 106ª of the catch plate 106 as a movable element carried by the rack nut 92, and the notch 80ª of the trip plate 80 as a stationary element. In this position of the toothed wheel simultaneous carriage and tool translation can be obtained for positively advancing the tool in depth or longitudinal feeding direction, as shown in Figs. 43-44. As the rack nut travels in the direction of the arrow *a* the wheel will be rotated, and as a result of tooth engagement with the catch and trip plates, will act as a lever to move the carriage also in a direction of the arrow *a*. The tool, under these conditions will feed into the work as the carriage travels forwardly, making a tapering cut, as illustrated in Fig. 44. As the rack nut advances, the latch 106 is disengaged from the toothed wheel, whereupon its progress is non-propulsive to the carriage until the nut abuttingly engages with a carriage abutment, likewise the carriage is free to move with the nut as the toothed wheel through its rotation frees itself from the catch plate 80.

The toothed wheel can be set for tooth cooperation with the catch plate 80, for applying a frictional or braking resistance to the carriage to withhold any carriage traverse until the carriage is positively moved through the propelling engagement with the rack nut. With the toothed wheel solely cooperating with the catch plate 106, frictional connection between the rack nut and carriage is obtained for carriage propulsion, the advance of the carriage being discontinued upon disengagement of the toothed wheel or frictional connection overcome by the working strains of the tools counteracting carriage advance, of advantage in facing work.

The adaptability of the braking mechanism can be considerably enlarged from that disclosed herein with the concept herein given regarded as sufficient for the present purposes.

The swivel block 50 having universal bearing upon the carriage can be rotated through an angle of 180° from the position shown in Fig. 8, at which position the slide traverse can be produced in a reverse order from that particularly set forth herein. It also provides a compound rest for the tool slide adapting the tools to set to an angular position.

The transmission control through the rack nut at determined limits of rack nut traverse upon the screw shaft, for either independent tool slide feed or carriage propulsion, adapts the use of a single transmission controlling rod for dual purposes, with a setting made by merely adjusting one or a plurality of nut engaging elements to appropriate positions upon the rod. The nut traverse for independently transmitting the tool slide and conveying the carriage in a progressive order and each in alternate directions provides for obtaining tool translation in a working cycle from a common starting and stopping point, with the degree of tool slide traverse independently regulatable without interfering with the tool traversing cycle, enabling the mechanism to be set for automatically machining and turning a large variety of work, and in which a setting can be conveniently and very accurately made by merely adjusting set nuts, and embracing a structure very durable for high power, rapid and heavy cut machining of the work to micrometer measurements.

From the above detailed description of the invention in relation to the preferred embodiment thereof illustrated in the drawings it will be seen that there are certain outstanding broader phases of the invention of primary importance.

One of these broader phases of the invention comprises means constituting new carriage and tool slide feeds, having relative motions and precision characteristics which form a basis enabling such a greatly extended employment of trips, stops and controls as to constitute what may be aptly termed a universal automatic tool.

Another one of the broader phases of the invention is the provision of a propelling mechanism, shown as mounted in the carriage, actuated through a trip-controllable and reversible member, whereby the carriage and tool slide feed may be driven as a unit to constitute a carriage feed, or said means may be actuated in relation to the carriage to constitute a tool slide feed, or whereby the feed may be the resultant of relative movements of the carriage and tool slide.

One of the valuable results obtainable from the coordination of these new feeds and controls is that any selected species of feed may be simultaneously performed upon opposite sides of the work, therefore greatly extending the automatic characteristics of the tool.

Many features of invention herein disclosed are not specifically claimed in this case for the reason that they can be much more intelligently disclosed and the advantages thereof specifically shown in applications copending herewith, in which all of the automatic movements and cycles are fully illustrated and diagramed.

Having described my invention, I claim:

1. In combination with a guide and feed screw parallel therewith, a carriage, a block rotatably adjustable thereon, said block having a slide-way therein, a cross-slide engaged with said way, a rack on said cross-slide, a shaft rotatable in said carriage, and centrally traversing said block, a gear on said shaft meshing with said rack, a cylindrical sleeve slidable lengthwise of said carriage loosely traversed by said feed screw, said sleeve having exterior teeth, a nut attached at the end of said sleeve in threaded engagement with said feed screw, and a second gear upon said shaft engaging the exterior teeth of said sleeve, whereby when said sleeve is translated in either direction, said slide will be correspondingly translated, and whereby said block may be rotated to reverse direction of slide translation relative to the direction of feed screw rotation.

2. In combination with a guide and feed screw parallel therewith, a carriage upon said guide, a block rotatably adjustable centrally of said carriage, said block having a slide-way therein, a cross-slide having a rib gibbed to said way, a gear rack on said cross-slide, a vertically disposed shaft rotatable in said carriage and centrally loosely traversing said block, a gear on said shaft meshing with said rack, a cylindrical sleeve slidable lengthwise of said carriage and loosely traversed by said feed screw, said sleeve having exterior teeth, a nut attached to said sleeve having threaded engagement with said feed screw, and a second gear upon said shaft engaging exterior teeth of said sleeve, whereby when said sleeve is translated in either direction the said slide will be correspondingly translated, and whereby when said block is rotated to an angle of 180° the direction of slide translation relative to direction of feed screw rotation will be reversed.

3. In combination with a guide and feed screw parallel therewith, a carriage slidable upon said guide and loosely traversed by said feed screw, a member slidable upon said carriage, a rack attached to said member, a second rack slidable lengthwise of said carriage and loosely traversed by said screw, a shaft and gear operatively connecting said racks, a nut on said second rack in threaded engagement with said feed screw, an adjustable stop at one end of said carriage loosely traversed by said feed screw, said adjustable stop engageable by said second rack for limiting translation thereof and for causing carriage movement, whereby when said feed screw is rotated, said slide will be translated a predetermined distance before said carriage is translated.

4. In combination with a guide, and a feed screw parallel with said guide, a carriage slidable upon said guide and loosely traversed by said feed screw, a member slidable upon said carriage, a rack attached to said member, a second rack slidable lengthwise of said carriage and loosely traversed by said feed screw, a shaft and gears operatively connecting said racks, a threaded nut attached to said second rack and engaging the threads of said feed screw, and stops at opposite ends of said carriage cooperative with said second rack and nut to limit slide translation in either direction and cause the carriage movement, whereby when said feed screw is rotated said slide will be translated for a predetermined period before said carriage is translated.

5. In a machine of the nature disclosed, a rail, a carriage translatable on said rail, a rotative screw shaft extending longitudinal with the rail, a tool-holding slide guiding translatable upon said carriage adapted for translation tranverse to the direction of carriage translation, and a carriage and tool slide propelling member non-rotatively sustained within the carriage having a threaded engagement with said screw shaft for traversing said member during shaft rotation, said member being in transmitting connection with said tool slide and adapted to transmittingly connect with said carriage.

6. In a machine of the nature disclosed, a carriage, a rotative screw shaft, a propelling member non-rotatively sustained within said carriage, and having a threaded engagement with said screw shaft, whereby the shaft rotation traverses said member, a tool slide guidingly translatable upon said carriage transmittingly connected with said propelling member.

7. In a machine of the nature disclosed, a rail, a carriage translatable on said rail, a rotative screw shaft extending longitudinally with the rail, and carriage propelling member non-rotatively sustained within said carriage and having a threaded engagement with said screw shaft for propelling member translation, and adapted to abuttingly connect with said carriage in alternate directions of member translation for conveying said carriage therewith.

8. In a machine of the nature disclosed, a rail, a carriage translatable on said rail, a rotative screw shaft extending longitudinally with the rail, a tool-holding slide guidingly translatable upon said carriage, and a carriage and tool slide propelling member non-rotatively sustained within the carriage having a threaded engagement with said screw shaft for traversing said member upon shaft rotation, said member being in constant transmitting connection with said tool slide and adapted to transmittingly connect with said carriage, the connection between said member and carriage providing for a limited degree of non-carriage conveying traverse, whereby said tool slide may be transmitted independently of said carriage.

9. In a machine of the nature disclosed, a carriage, a rotative screw shaft, a carriage propelling member non-rotatively sustained within said carriage and having a determined non-carriage conveying traverse, and a threaded engagement with said screw shaft, whereby the shaft rotation traverses said member, and a tool slide guidingly translatable upon said carriage transmittingly connected with said propelling member, whereby the tool slide may be translated independently of the carriage.

10. In a machine of the nature disclosed, a rail, a carriage translatable on said rail, a rotative screw shaft extended longitudinally with the rail, and carriage propelling member non-rotatively sustained within said carriage and having a threaded engagement with said screw shaft for propelling member translation, and adapted to abuttingly connect with said carriage in alternate directions of member translation for conveying said carriage therewith, and providing a limited non-carriage conveying traverse of said propelling member between the carriage engaging abutments.

11. In a machine of the nature disclosed, a rail, a carriage translatable on said rail, a rotative screw shaft, a propelling member threaded upon said screw shaft translated by the rotation of said shaft in a direction governed by the direction of shaft rotation, a tool slide translatable upon said carriage transmittingly connected with said propelling member, said propelling member being adapted to connect with said carriage for conveying the same, the connection between carriage and propelling member providing for an intervening non-carriage propulsion motion of said member when changing the direction of member translation for a tool slide translation independently of the carriage.

12. In a machine of the nature disclosed, a rail, a carriage translatable on said rail, a rotative screw shaft, a propelling member threaded upon said screw shaft translated by the rotation of said shaft in a direction governed by the direction of shaft rotation, a tool slide translatable upon said carriage transmittingly connected with said propelling member, said propelling member being adapted to connect with said carriage for conveying the same, the connection between carriage and propelling member providing for an intervening non-carriage propulsion motion of said member when changing the direction of member translation for a tool slide translation independently of the carriage, and means for controlling the rotation and direction of rotation of said shaft.

13. In a machine of the nature disclosed, a carriage translatably supported, a tool slide translatably supported upon said carriage, a propelling member for conveying the carriage when engaged therewith and translating said guide, when disengaged from the carriage, transmitting means between said slide and propelling member, the carriage and slide being translatable in reverse directions by reversing the traverse of said propelling member, and screw means for translating said propelling member in reversible directions.

14. In a machine of the nature disclosed, a carriage translatably supported, a tool slide translatably supported upon said carriage, a propelling member for conveying the carriage when engaged therewith and translating said slide, transmitting means between said slide and propelling member, the slide being translatable in reverse directions by reversing the traverse of said propelling member, and screw means for translating said propelling member in reversible directions, said member being adapted to translate between opposing carriage engaging limits, whereby the member can translate the tool slide independently of the carriage.

15. In a machine of the nature disclosed, a carriage, a tool feeding slide upon said carriage, a screw-fed rack movable for feeding the carriage and tool slide, in feeding transmission connection with said tool slide and disposed for carriage feeding engagement between opposing carriage abutments, carriage abutments spaced to provide an intermediate non-carriage feeding traverse of the rack for independent tool slide feed, and a screw shaft for feeding said rack, and reversible power means for moving said rack in alternate directions.

16. In a machine of the nature disclosed, a carriage, a tool feeding slide upon said carriage, a rack movable for feeding the carriage and tool slide in feeding transmission connection with said tool slide and disposed for carriage feeding engagement between opposing carriage abutments, carriage abutments spaced to provide an intermediate non-carriage feeding traverse of the rack for independent tool slide feed, and reversible power means for moving said rack in alternate directions.

17. In a machine of the nature disclosed, a carriage translatably supported, a tool slide translatably supported upon said carriage, a propelling member for conveying the carriage when engaged therewith and translating the tool slide, having a non-carriage engaging traverse between regulatable carriage engaging limits for translating said tool slide independently of said carriage or in advance thereof, means on said carriage providing regulatable carriage engaged limits for said propeller, transmitting means connecting said member and tool slide, and means for translating said member in reversible directions.

18. In a machine of the nature disclosed, a carriage translatably supported, a tool slide translatably supported upon said carriage, a propelling member for conveying the carriage in reverse directions, when engaged therewith and for translating said tool slide in alternate directions, governed by the direction of traverse of said member, said member having a non-carriage engaging traverse between regulatable carriage engaging limits for translating said tool slide independently of said carriage or in advance thereof, means on said carriage providing regulatable carriage engaged limits for said propeller, transmitting means connecting said member and tool slide, and a screw shaft for translating said member in reversible directions.

19. In a machine of the nature disclosed, a frame, a carriage translatably supported upon said frame, a tool slide translatable upon said carriage, a propelling member for translating said tool slide and said carriage with the tool slide as a unit, said member transmittingly connecting with said tool slide and adapted to engage with the carriage to convey the same, means for translating said propelling member, and friction brake means for connecting said carriage and frame for resisting carriage conveying motion.

20. In a machine of the nature disclosed, a carriage translatably supported, a tool slide rest rotatively adjustable upon said carriage, a tool slide translatable upon said rest, a propelling member for translating said tool slide and said carriages with the rest and tool slide as a unit, said member transmittingly connected with said tool slide and adapted to engage with the carriage to convey the same, and means for translating said propelling member in reverse directions.

21. In a device of the class described, a carriage, a tool slide thereon, a rotary power shaft, a feed member driven by and movable longitudinally of said shaft intermediately of spaced carriage abutments for propelling said carriage and slide as a unit to constitute a carriage feed, spaced carriage abutments for feed member engagement, and translating mechanism connecting said feed member and slide, rendered inactive by engagement of said feed member with a carriage abutment, and rendered active by disengagement therewith to constitute an independent tool slide feed.

22. In a device of the class described, a carriage, a tool slide thereon, a feed actuating member, a feed connecting member operated thereby in relation to spaced carriage abutments, constituting a unitary carriage and tool slide feed, spaced carriage abutments for feed member engagement, translating mechanism operatively connecting said feed member and slide, rendered inactive by engagement of said feed member and carriage abutment, and rendered active by disengagement to constitute an independent tool slide feed.

23. In a device of the class described, a carriage, a tool slide thereon, a reversible power shaft, a member driven by said shaft for propelling said carriage and slide as a unit to constitute a carriage feed, and means for moving said member in relation to the carriage to constitute a tool slide feed, the direction of carriage and slide motion controllable by direction of shaft rotation.

24. In a device of the class described, a carriage, a tool slide thereon, a reversible power shaft, a member driven by said shaft for propelling said carriage and slide as a unit to constitute a carriage feed, means for moving said member in relation to the carriage to constitute a tool slide feed, and means operable in relation to said member, whereby said member feeds the tool slide during the carriage movement, the direction of carriage and slide motion controllable by direction of shaft rotation.

25. In a device of the class described, a carriage, a tool slide thereon, a reversible power shaft, a member driven by said shaft, means controlled by the position of said member to operate said carriage and slide as a unit, and means controlled by said member to operate the tool slide independently when said member is moved in relation to the carriage, the direction of carriage and slide motion controllable by direction of shaft rotation.

26. In a machine of the class described, means for supporting the work medially and longitudinally of the bed, a carriage reciprocal on opposite sides of the bed, a tool slide reciprocal on each carriage, a member upon each side of the bed reciprocal longitudinally thereof and in relation to the carriage, means translating the reciprocal motion of said member into tool slide motion, and means for rendering said tool slide motion inoperative during determined carriage movement, enabling the simultaneous performance of different characters of cutting upon opposite sides of the work.

27. In a lathe, a track support, a carriage traversing on said support, a superposed member swiveled on said carriage, a tool carrier slidably mounted in said swiveled member, a shaft coaxial with said swiveled member and journaled therein, a pair of gears fixed on said shaft, a rack carried by said tool carrier and connecting with one of said gears, a translatable member to be translated thereby having a rack connecting with the second of said gears for operating said tool carrier, a screw shaft having a threaded engagement with said member for translating the same, said member adapted to engage said carriage to convey the same therewith, and capable of translating within non-carriage engaging limits for effecting a tool carrier translation independent of said carriage.

In witness whereof, I hereunto subscribe my name.

FRANCIS B. COCKBURN.